(12) United States Patent
Hobson et al.

(10) Patent No.: US 8,258,422 B2
(45) Date of Patent: Sep. 4, 2012

(54) PLUNGE ADJUSTMENT MECHANISM FOR A STUD WELDING TOOL

(76) Inventors: Blake Hobson, Crystal Lake, IL (US); Scott Zeeb, Chicago, IL (US)

( * ) Notice: Subject to any disclaimer, the term of this patent is extended or adjusted under 35 U.S.C. 154(b) by 1036 days.

(21) Appl. No.: 11/829,660

(22) Filed: Jul. 27, 2007

(65) Prior Publication Data

US 2009/0026187 A1    Jan. 29, 2009

(51) Int. Cl.
*B23K 11/04* (2006.01)
*B23K 9/00* (2006.01)

(52) U.S. Cl. .......................... 219/98; 219/136
(58) Field of Classification Search ............ 219/98, 219/99; 408/4, 113, 202
See application file for complete search history.

(56) References Cited

U.S. PATENT DOCUMENTS

| | | | | |
|---|---|---|---|---|
| 2,451,190 A | * | 10/1948 | Anderson | 219/98 |
| 3,712,352 A | * | 1/1973 | Lafferty, Sr. | 81/429 |
| 4,002,876 A | * | 1/1977 | Wieland, Jr. | 219/98 |
| 4,092,514 A | * | 5/1978 | Burton | 219/99 |
| 4,117,927 A | * | 10/1978 | Gothsche | 206/319 |
| 4,871,895 A | * | 10/1989 | Preston | 219/99 |
| 6,723,945 B2 | * | 4/2004 | Kurz | 219/98 |

FOREIGN PATENT DOCUMENTS

GB    2042391 A    *    9/1980

\* cited by examiner

*Primary Examiner* — Sang Paik
(74) *Attorney, Agent, or Firm* — McAndrews, Held & Malloy Ltd.

(57) ABSTRACT

The present technology relates to adjustment mechanisms for control settings on stud weld tools. Stud welding tools typically have a body that comprises a handle, a front end and a rear end. In one aspect, the present technology relates to plunge adjustment mechanisms for stud welding tools that are located at the front end of a stud welding tool and provide an adjustment knob for manual plunge adjustment. Another aspect of the present technology relates to weld heat adjustment mechanisms for stud welding tools that are located at the rear end of a stud welding tool and provide an adjustment knob for manual weld heat adjustment.

19 Claims, 4 Drawing Sheets

PLUNGE ADJUSTMENT MECHANISM FOR A STUD WELDING TOOL

BACKGROUND OF THE INVENTION

This invention relates to stud welding which is a form of electric arc welding. In practice, a metal stud is loaded into an electrically energizable collet, which is usually situated in the barrel of a stud welding tool, and is then grasped and positioned over an attachment site on a work area or work piece. When the tool is energized, an arc is created between the distal end of the stud and the attachment site on the metal work piece. The arc melts both the distal tip of the stud and creates a molten pool at the area of attachment on the work piece. A timing device in the tool determines the duration of the arc and, when the arc is completed, the tool plunges the stud into the molten pool at the area of attachment, creating a weldment to the work piece.

One aspect of stud welding is ensuring proper setting of the plunge on the stud weld tool. The plunge is the amount of the weld stud protruding past the end of the plunge stop. The amount of plunge effects two different parameters. First, it affects the amount of preload on the main weld spring. More plunge equates to more preload, which results in shorter weld times. Although adjusting the amount of plunge is not the primary means of adjusting weld timing, the timing effect does need to be considered. The second effect, is to control the pressure and/or depth used in joining the melted base material to the melted face of the fastener, with more plunge resulting in more pressure or depth used in joining the melted surfaces together.

In one currently utilized plunge adjustment method, a leg and foot assembly is mounted to the exterior of the stud welding tool. The mounting feature can be an aluminum face plate on the stud welding tool having holes through which the legs of the assembly are slidably attached. Set screws can be used to lock the legs in place at a desired setting. With this type of plunge adjustment configuration, the plunge can be adjusted by sliding the assembly forward or rearward along the tool relative to the weld stud. Sliding the assembly is typically accomplished by loosening the set screws, manually sliding the assembly until the line up looks to be "right" then retightening the set screws. The leg and foot assembly plunge adjustment method is, at best, an imprecise adjustment method. Furthermore, this adjustment method requires the use of extra tools for loosening and tightening the set screws, and results in increased procedure time.

A second known method of adjusting plunge, though being less common, is to adjust the weld stud collet depth stop. This adjustment method is not convenient because it requires removal of the collet which typically requires the use of extra tools.

Further, the weld parameters are impacted by other mechanical settings controlled by the weld tool. For example, another aspect of stud welding relates to proper setting of the timing device in the tool that determines the duration, or length, of the arc. Various stud welding tools control this welding parameter in different ways. For example, spring compression is used in contact capacitor discharge (CD) welding, gap distance is used in gap CD welding, and solenoid lift distance is used in drawn arc stud welding.

In contact CD welding, the weld fastener generally starts in contact with work piece and all components are not moving at the start of the weld sequence. Contact CD welding utilizes spring pressure to control the arc timing. The more compressed the main weld spring, the faster the tool drives the weld fastener into the weld puddle. One common way of adjusting the spring pressure is to change the spring within the weld tool, such as changing to a higher fixed rate spring. Another common way of adjusting the spring pressure is to utilize a simple screw mechanism that increases or decreases the spring preload.

For gap CD welding, the weld fastener starts the weld sequence raised above the work piece. This distance that the fastener is raised above the work piece is called the gap distance. Once the weld cycle is initiated, the weld fastener accelerates toward the work piece. By varying the initial gap distance, the amount of time the weld fastener has to accelerate changes, which changes the speed at which the weld fastener contacts the work piece and proceeds into the weld puddle.

Finally, in drawn arc welding, the solenoid lifts the weld fastener away from the work piece. This lift distance controls the length of the arc that can be established. Longer arcs generate higher temperature as there is more resistance in a longer arc. Changing the solenoid position changes the lift distance, thus effecting the arc length.

BRIEF SUMMARY OF THE INVENTION

The present technology relates to adjustment mechanisms for control settings on stud weld tools. Stud welding tools typically have a body that comprises a handle, a front end and a rear end. A weld and control cable generally runs from the bottom of the handle and connects the tool to a power source. The handle of a stud welding tool usually has a button therein that the operator depresses to initiate the arc and perform the welding operation. The fastener is held at the front end of the tool.

In at least one aspect, the present technology relates to plunge adjustment mechanisms located at the front end of the stud welding tool. For example, in at least one embodiment a plunge adjustment mechanism for a stud welding tool is provided where the stud welding tool has a body comprising a front end and a rear end, and the plunge adjustment mechanism comprises: a plunge stop, an adjustment knob having an operation position and an adjustment position, and a fixed mounting location that movably engages the plunge stop. In certain embodiments, the plunge adjustment mechanism for a stud welding tool comprises a plunge stop having keyways therein, a bearing that engages the plunge stop; and an adjustment knob having an operation position and an adjustment position, and having keys therein that engage the keyways of the plunge. In some such embodiments, a threaded bearing is provided, and the threads of the bearing rotatably engage the plunge stop. At least some preferred embodiments further provide a spring that engages the bearing that exerts spring force on the knob to maintain the knob in the operational position. In particularly preferred embodiments, the knob is rotatable in the adjustment position, and wherein rotation of the knob causes rotation of the plunge stop and moves the plunge stop along the threads of the bearing.

Another aspect of the present technology relates to weld heat adjustment. In accordance with the present technology, the weld heat is preferably adjusted through the use of an adjustment knob located at the rear of the stud welding tool. In at least one embodiment of a heat adjustment mechanism for a gap adjustment type stud welding tool, the heat adjustment mechanism comprises an adjustment knob having adjustment ribs, a solenoid sleeve that moveably engages the adjustment knob and receives a solenoid, a clutch having adjustment ribs that engage the adjustment ribs on the adjustment knob, a clutch spring that exerts force on the clutch, and a solenoid that is received by and connects to the solenoid sleeve. In at least another embodiment for a compressed spring stud welding tool, the heat adjustment mechanism comprises an adjustment knob having adjustment ribs, a spring sleeve that moveably engages the adjustment knob and receives a weld timing spring, a clutch having adjustment ribs that engage the adjustment ribs on the adjustment knob, a clutch spring that exerts force on the clutch, and a weld timing spring that is received by the spring sleeve.

DETAILED DESCRIPTION OF THE INVENTION

Adjustment mechanisms of the present technology have been found to offer several advantages as compared to currently used methods of adjustment on stud weld tools. For example, the present technology provides quick, easy adjustment of the welding parameters on a stud weld tool. One advantage of various embodiments of the present technology is the ability to make adjustments to the tool without the need for additional tools. Additionally, the present technology preferably provides the user with visual feedback of the adjustment location, which can provide more consistent set up over time. Furthermore, in at least certain embodiments, adjustments mechanisms of the present technology allow for adjustment of control settings in small, predetermined increments that are definitive and precise, and thus reduce or eliminate the amount of operator guesswork.

In embodiments of the present technology, adjustment mechanisms can be located at one or more areas of the weld tool. For example, in some preferred embodiments, a plunge adjustment mechanism is located at the front of the tool that controls how much of the weld fastener is plunged into the weld pool. In other preferred embodiments, a weld heat adjustment mechanism is located at the rear of the stud welding tool that controls the speed or distance at which the fastener is advanced during the arcing process, thus controlling the arcing time.

Figure 1:
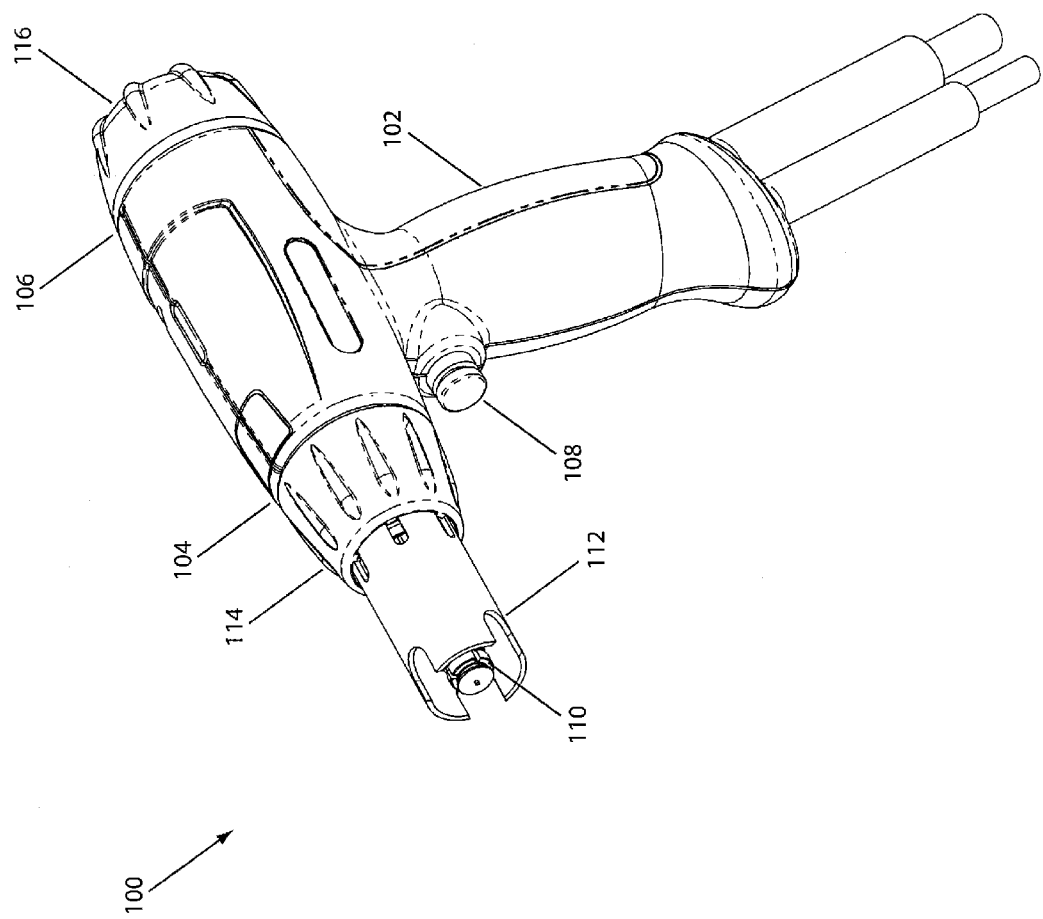
FIG. 1 illustrates one preferred embodiment of the present technology.

FIG. 1 illustrates one preferred embodiment of the present technology, which has both a plunge adjustment mechanism and a weld heat adjustment mechanism. As illustrated, the stud welding tool 100 has a body that comprises a handle 102, a front end 104 and a rear end 106. The handle 102 of the stud welding tool has a button 108 that the operator depresses to initiate the arc and perform the welding operation. FIG. 1 also illustrates a collet 110 for holding the fastener, a spark shield 112, and a plunge adjustment knob 114 at the front end of the tool. A weld heat adjustment knob 116 is located at the rear of the weld tool.

Plunge Adjustment

In one aspect, the present technology relates to plunge adjustment mechanisms for stud welding tools. As discussed above, a stud welding tool has a body comprising a front end and a rear end. Plunge adjustment mechanisms of the present technology are preferably located at the front end of a stud welding tool. In preferred embodiments, an adjustment knob is located at the front end of the stud welding tool, adjacent to the main body of the tool.

Plunge adjustment mechanisms of the present technology generally comprise a plunge stop, an adjustment knob having an operation position and an adjustment position, and a fixed mounting location that movably engages the plunge stop. A fixed mounting location is a mounting location that does not move relative to the spindle, and can be, for example, a bearing or the body of the stud welding tool itself.

In preferred embodiments, the adjustment knob mechanically engages the plunge stop. For example, plunge adjustment mechanisms of the present technology preferably comprise a plunge stop having keyways therein, a bearing that engages the plunge stop, and an adjustment knob having an operation position and an adjustment position. In at least some preferred embodiments, the adjustment knob has keys therein that engage the keyways of the plunge stop. The plunge stop can be, for example, a spark shield, a tripod leg assembly, or any other suitable plunge stop. The plunge stop can be made from any suitable material, including but not limited to brass or aluminum. In at least some embodiments, the keyways of the adjustment knob engage the keyways of the plunge stop when the knob is in the operational position as well as when the knob is in the adjustment position. In such embodiments, the knob and the plunge stop preferably cannot rotate during operation of the stud welding tool.

In accordance with the present technology, plunge adjustment can be accomplished by an operator by utilizing the adjustment knob. The adjustment knob for plunge adjustment preferably has an operational position and an adjustment position. The operational position is the primary, or resting, position of the knob, and is the position that the adjustment knob is in during the operation of the stud welding tool. In the operational position, the adjustment knob is preferably locked in place to prevent inadvertent adjustment. The adjustment position is a secondary position, or adjustment position, that the adjustment knob can be moved to in order to permit plunge adjustment.

In preferred embodiments, the adjustment knob can be moved from the operational position to the adjustment position by the exertion of manual force to pull the knob out, away from the main body of the weld tool. In particularly preferred embodiments, a continuous exertion of manual force is applied to maintain the adjustment knob in the adjustment position. In other embodiments, the continuous exertion of manual force is not necessary to maintain the adjustment knob in the adjustment position. For example, the adjustment knob could remain in the adjustment position until being moved back to the operational position. When the adjustment knob is in the adjustment position, the knob can be rotated through various plunge settings in order to adjust the plunge by increasing or decreasing the amount of the fastener available for welding. The plunge settings preferably allow for adjustment of the plunge in small increments, such as, for example, from about 0.005 inches to about 0.01 inches. In a particularly preferred embodiment, the plunge settings adjust the plunge in increments of about 0.007 inches per setting. Preferably, an operator releases the knob when the adjustment is complete and the knob retracts from its pulled out adjustment position back to its resting, or operational, position.

Figure 2:
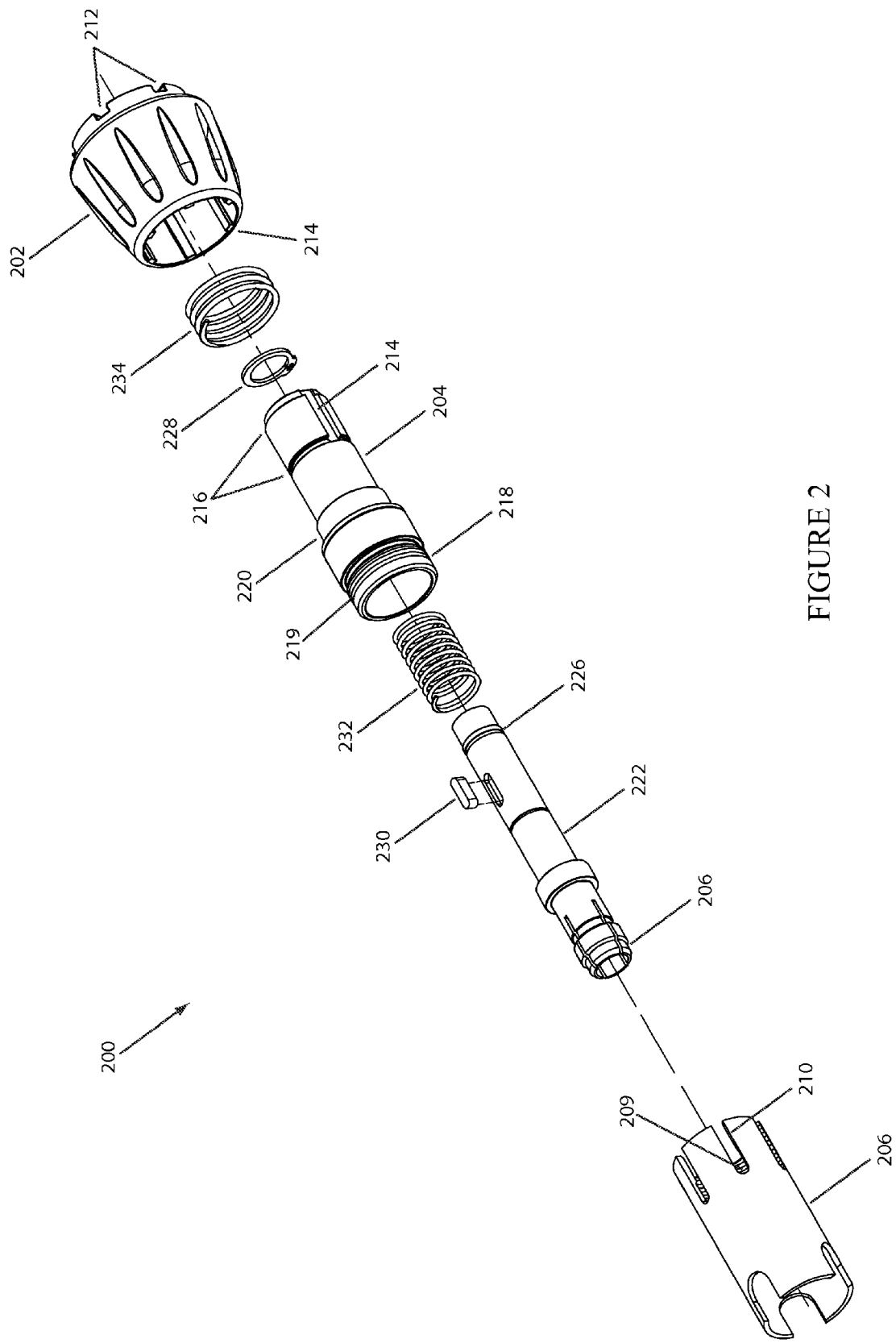
FIG. 2 illustrates an exploded view of one plunge adjustment mechanism of the present technology.

FIG. 2 provides an exploded view of a preferred embodiment of a plunge adjustment mechanism of the present technology. As illustrated, the plunge adjustment mechanism 200 comprises an adjustment knob 202, a bearing 204, and a plunge stop. The plunge stop in the illustrated embodiment is a spark shield 206. The adjustment knob 202 has keys 208.

The keys 208 are preferably molded into the body of the adjustment knob 202. The adjustment knob 202 has keyways 212 at the back of the knob. The keyways 212 at the back of the knob engage the at least one key in the body of the stud welding tool (not shown), and prevent inadvertent adjustment when the knob is in the operate position.

The bearing 204 is preferably held in a fixed location relative to the body of the stud welding tool via an anti-rotation feature 214 that engages the body. The anti-rotation feature as illustrated in this embodiment comprises a groove or notch. Other anti-rotation features are also acceptable, and can include, for example, a tab or a key. The bearing 204 also preferably has at least one anti-shift feature, that engages the body of the stud welding tool to prevent fore and aft movement of the bearing. Anti-shift features can include, for example, a groove, a notch, a tab, or a key. The embodiment of FIG. 2 comprises two anti-shift grooves 216. Additionally, the bearing of FIG. 2 comprises a shoulder 220 that engages or retains the adjustment knob.

In the embodiment of FIG. 2, the bearing 204 has a collar 218 located at the end of the bearing. In preferred embodiments, the collar 218 movably engages the plunge stop, such as, for example, rotatably or slidably engaging the plunge stop. For example, in a particularly preferred embodiment, the bearing 204 comprises a collar 218 that is threaded, and the threaded collar rotatably engages the plunge stop.

The weld spindle 222 has compression fingers 224 that clamp down onto a collett (not shown) when a compression nut (not shown) is tightened onto compression fingers 224. The collett (not shown) holds a fastener during a welding operation. Groove 226 at the opposite end of spindle 222 that engages snap ring 228. The spindle 222 is preferably held in a fixed position with respect to the bearing. For example, as illustrated in FIG. 2, the spindle 222 has at least one key 230 that engages a keyway within bearing 204 to prevent the spindle from rotating with respect to the bearing. The weld spring 232 drives the weld spindle 222 forward, toward the work piece, when the solenoid is de-energized.

As illustrated in FIG. 2, the spark shield 206 has keyways 210 that slidably engage keys 208 of the adjustment knob 202. In embodiments where the plunge stop is threaded onto the collar of the bearing, rotation of the adjustment knob during plunge adjustment causes the plunge stop to rotate, and the rotation of the plunge stop causes the plunge stop to move along the threads 219 of the bearing. Preferably, spark shield 206 includes threads 209 that are threaded onto the collar 218 of the bearing 204, and rotation of the adjustment knob 202 during plunge adjustment causes the spark shield 206 to rotate. The rotation of the spark shield 206 causes the spark shield 206 move forwards or back as it is unthreaded or further threaded along the collar 218 of the bearing 204. The movement of the spark shield exposes more or less of the fastener being held by the tool, thus adjusting the plunge.

In embodiments such as that illustrated in FIG. 2, the plunge stop is electrically isolated from the weld spindle. An isolation element, such as a plastic insulator, can be utilized as an isolation element. In some embodiments, the bearing 204 comprises multiple components, at least one of which can be an isolation element. For example, a bearing can comprise a rear component that engages the weld spindle, a middle component that is an isolation element, and an end component that engages the plunge stop.

The adjustment knob 202 illustrated in FIG. 2 has an operational position and an adjustment position. In preferred embodiments, to move the adjustment knob 202 into the adjustment position, manual force can be exerted to counteract the spring force and move the knob 202 into the adjustment position. In such embodiments, release of the manual force allows the spring pressure to move the knob from the adjustment position to the operational position. In preferred embodiments, the knob is rotatable in the adjustment position, and manual rotation of the knob causes the plunge stop to rotate. With respect to the embodiment illustrated in FIG. 2, the adjustment mechanism comprises a spring 234 that engages the bearing 204 and exerts spring force on the adjustment knob 202 to maintain the knob in the operation position. When the knob 202 is in the operational position. The spring 234 compresses upon such exertion of manual force and the keyways 212 clear the keys in the body (not shown) to allow the adjustment knob to rotate clockwise or counter-clockwise to adjust the plunge. When the manual force compressing the spring 234 is removed, the knob 202 returns to the operational position, with the keyways 212 engaged to maintain the setting.

Weld Heat Adjustment

Another aspect of the present technology relates to weld heat adjustment. Adjustment knobs for weld heat adjustment mechanisms of the present technology are preferably located at the rear of the stud welding tool. Typically, there are two different types of weld heat control: a lift solenoid or a compressed spring. Weld heat adjustment mechanisms of the present technology can be utilized with either type of weld heat control.

Weld heat adjustment mechanisms of the present technology comprise an adjustment knob and a clutch. The clutch in a weld heat adjustment mechanism of the present technology is preferably under spring pressure to prevent inadvertent adjustment. The adjustment knob is preferably in a rotatable fixed position relative to the body of the stud welding tool. The weld heat can be adjusted by rotating the adjustment knob. In a compressed spring style weld tool, rotation of the adjustment knob increases or decreases the compression on the weld timing spring. In a lift solenoid style tool, rotation of the adjustment knob moves the lifting solenoid forward or rearward in the tool, and the solenoid location effects the solenoid stroke, which in turn affects the weld heat.

Gap Heat Adjustment

Heat adjustment mechanisms of the present technology for a lift solenoid type stud welding tool, also called a gap adjustment welding tool, preferably comprise an adjustment knob having adjustment ribs, a solenoid sleeve that moveably engages the adjustment knob and receives a solenoid, a clutch having adjustment ribs that engage the adjustment ribs on the adjustment knob, a clutch spring that exerts force on the clutch, and a solenoid that is received by and connects to the solenoid sleeve. The solenoid sleeve preferably comprises at least one anti-rotation feature that prevents the solenoid sleeve from rotating with respect to the body of the welding tool. The clutch also preferably comprises at least one anti-rotation feature that prevents the clutch from rotating with respect to the body of the welding tool. Anti-rotation features can be any feature suitable for preventing rotation of a component, and include, for example, a notch, a tab, a cut-out, or a groove. The clutch spring can be any suitable type of spring, including, for example, a wave spring or a compression spring.

In preferred embodiments of the present technology, the solenoid sleeve moveably engages the adjustment knob by a threaded connection. In such embodiments, rotation of the adjustment knob causes the solenoid sleeve to move linearly, thus lifting solenoid forward or rearward in the tool.

Figure 3:
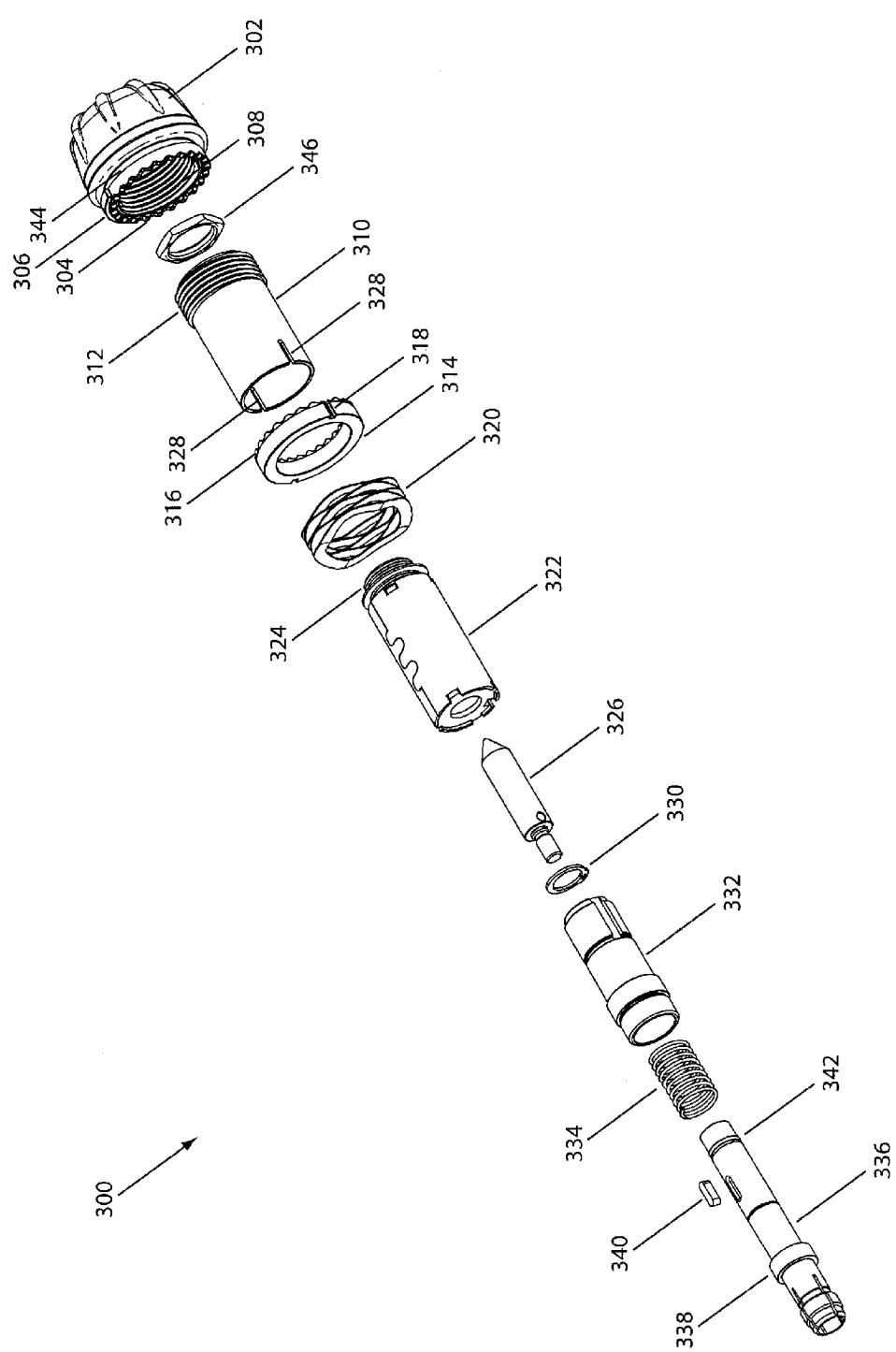
FIG. 3 illustrates an exploded view of one weld heat adjustment mechanism of the present technology.

FIG. 3 illustrates one preferred embodiment of a weld heat adjustment mechanism 300 of the present technology for a gap adjustment type stud welding tool. As illustrated in FIG.

3, adjustment knob 302 comprises adjustment ribs 304. Adjustment knob 302 also comprises a travel limiting rib 306 that prevents the adjustment knob 302 from rotating beyond a certain point, thus providing a limitation on the range of adjustment. Limitation of the range of adjustment can be desirable for several reasons. For example, it is undesirable to adjust the solenoid forward to such an extent that is bottoms out the plunger 326. Additionally, it is undesirable to adjust the solenoid rearward to such an extent that the electric field becomes too weak to draw the plunger in during generation of an arc. Behind the travel limiting rib 306 on the adjustment knob 302, there is a retention groove 344 that engages the body of the stud weld tool and prevents the knob from moving in or out relative to the body of the stud weld tool. In this manner, the adjustment knob 302 is held in a rotatable fixed position relative to the body of the stud weld tool.

As illustrated in FIG. 3, the solenoid sleeve moveably engages the adjustment knob by a threaded connection. Adjustment knob 302 further comprises a threaded interior surface 308. Solenoid sleeve 310 comprises a threaded end 312 that correspond to the threads 308 on the interior surface of the adjustment knob. The solenoid sleeve 310 comprises two anti-rotation tabs 328 in the form of cut-outs at the end of the solenoid sleeve opposite the threaded end 312. Although not illustrated, the body of the stud welding tool in this embodiment comprises a corresponding tab, or other suitable feature, that engages the anti-rotation tabs 328 and prevents the solenoid sleeve from rotation with respect to the body. During adjustment, rotation of the adjustment knob 302 causes the solenoid sleeve 310 to unthread or further thread with respect to the adjustment knob. Because the solenoid sleeve 310 cannot rotate with respect to the weld tool body, the solenoid sleeve 310 moves linearly forward or rearward in the tool. The movement of the solenoid sleeve moves the solenoid in or out, which changes the distance that the plunger 326 moves during an arc, which affects the speed at which the tool activates, and thus adjusts the weld heat.

Clutch 314 comprises adjustment ribs 316 that correspond to and engage adjustment ribs 304 of the adjustment knob 302. Clutch 314 also comprises at least one anti-rotation feature 318. Although not illustrated, the body of the stud welding tool in this embodiment comprises a corresponding feature that engages the anti-rotation feature 318 and prevents the clutch from rotating with respect to the body.

In embodiments such as that illustrated in FIG. 3, the weld heat settings are preferably indicated in a visual manner, such as, for example, by a decal, on the adjustment knob or on the rear of the stud weld tool. The exertion of manual force to rotate the adjustment knob causes the adjustment ribs 304 on the adjustment knob to engage successive adjustment ribs 316 on the clutch 314. Each successive engagement is a click that can be felt by the operator. The number of clicks required to achieve a different weld heat setting can vary depending upon the size of the adjustment ribs on the adjustment knob and on the clutch, as well as upon the welding application and material being welded. In at least one preferred embodiment, it takes 3 or 4 clicks to achieve a different weld heat setting. In preferred embodiments, each weld heat setting provides a discreet increment of solenoid movement. For example, in some embodiments, a weld heat setting adjustment is made by solenoid movement of from about 0.15 mm to about 0.30 mm. More preferably weld heat settings are determined by solenoid movement of from about 0.20 mm to about 0.25 mm. In at least one particularly preferred embodiment, the amount of solenoid movement per heat setting is about 0.22 mm.

As illustrated, a wave spring 320 exerts force on clutch 314 to maintain the clutch in an operational position and prevent inadvertent weld heat adjustment. When manual force is exerted on the adjustment knob 302, the clutch 314 compresses the wave spring 320 to allow rotation of the adjustment knob 302. In other embodiments of the present technology, a compression spring can be utilized instead of a wave spring.

The solenoid 322 is received by and connects to solenoid sleeve 310. As illustrated in FIG. 3, the solenoid 322 has a threaded end 324 that engages nut 346 to hold the solenoid 322 inside the solenoid sleeve 310.

The weld spring 334 slides over the spindle 336 and seats against the forward spring seat 338. This assembly slides into the bearing housing 332, and the key 340 on the spindle 336 fits into a key retainer in bearing 332. The spindle 336 is received by the bearing 332 such that the rear snap ring groove 342 protrudes. Snap ring 330 engages the snap ring groove 342, and holds this assembly together. The solenoid plunger 326 engages the rear of the spindle 336, preferably by screwing into the rear of the spindle 336. The entire spindle assembly can thus be lifted, against spring 334, when the solenoid 322 is energized.

Contact Heat Adjustment

Heat adjustment mechanism for a compressed spring stud welding tool, also called a contact welding tool, preferably comprise an adjustment knob having adjustment ribs, a spring sleeve that moveably engages the adjustment knob and receives a weld timing spring, a clutch having adjustment ribs that engage the adjustment ribs on the adjustment knob, a clutch spring that exerts force on the clutch, and a weld timing spring that is received by the spring sleeve. The spring sleeve preferably comprises at least one anti-rotation feature, such as, for example, a notch, tab, or groove, that prevents the spring sleeve from rotating with respect to the body of the welding tool. The clutch also preferably comprises at least one anti-rotation feature that prevents the clutch from rotating with respect to the body of the welding tool. The clutch spring can be any suitable type of spring, including, for example, a wave spring or a compression spring.

In preferred embodiments of the present technology, the spring sleeve preferably moveably engages the adjustment knob. In at least one preferred embodiment, the spring sleeve moveably engages the adjustment knob by a threaded connection. In such embodiments, the interior of the adjustment knob is preferably threaded, and the spring sleeve has corresponding threads that engage the threads on the adjustment knob. Rotation of the adjustment knob thus causes the spring sleeve to move linearly, which increases or decreases the compression of the weld timing spring. The weld timing spring exerts force on the spindle that holds the fastener, and thus controls the weld heat.

Figure 4:
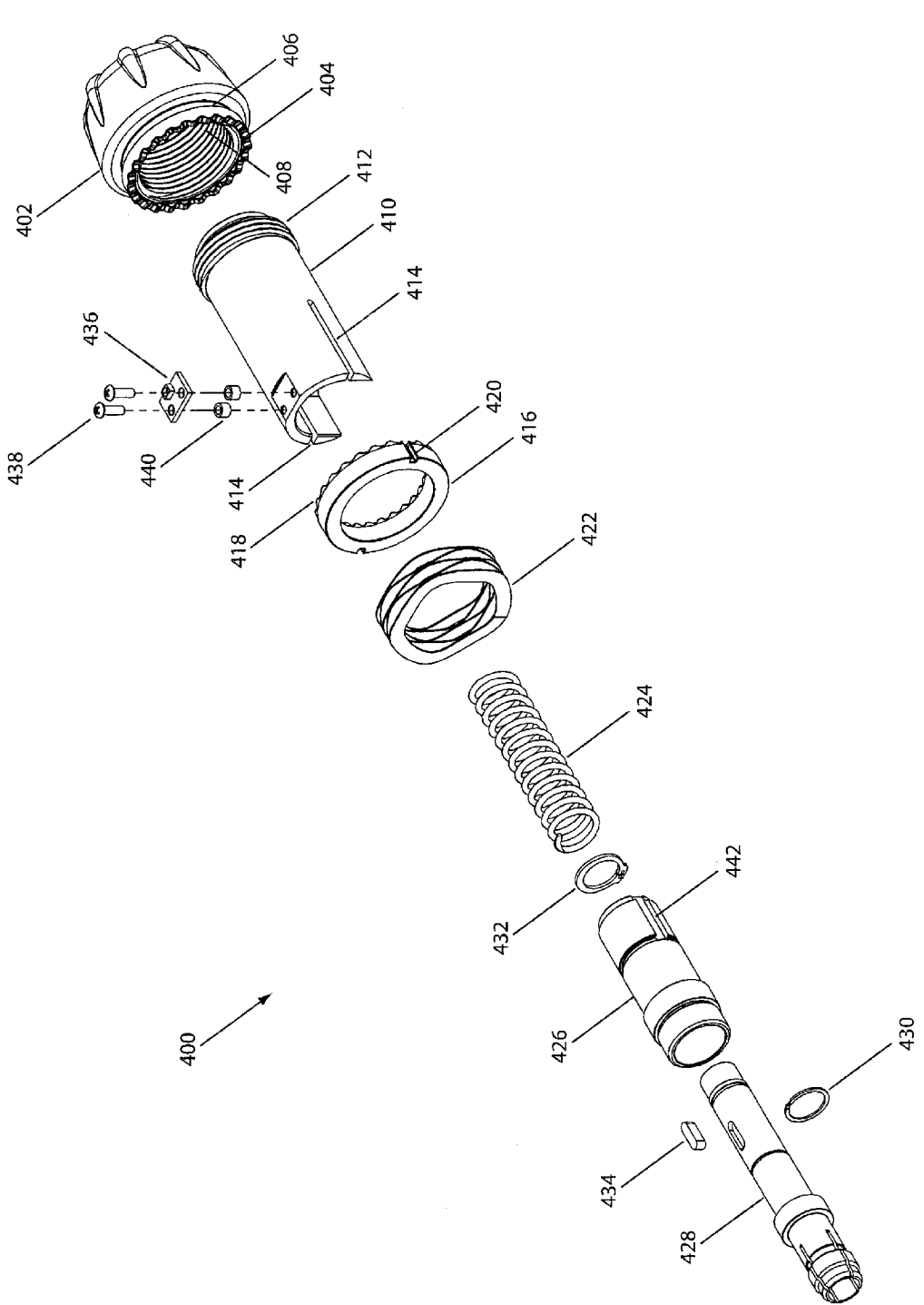
FIG. 4 illustrates an exploded view of one weld heat adjustment mechanism of the present technology.

FIG. 4 illustrates one preferred embodiment of a weld heat adjustment mechanism 400 of the present technology for a compressed spring type stud welding tool. As illustrated in FIG. 4, adjustment knob 402 comprises adjustment ribs 404. Adjustment knob 402 also comprises a retention groove 406 that engages the body of the stud weld tool and prevents the knob from moving in or out relative to the body of the stud weld tool. In this manner, the adjustment knob 402 is held in a rotatable fixed position relative to the body of the stud weld tool.

In contrast to the embodiment illustrated in FIG. 3, the adjustment knob 402 in the embodiment illustrated in FIG. 4 preferably does not have a travel limiting rib. Significant amounts of adjustment to the weld timing spring are sometimes called for in various stud welding applications, and it is therefore preferred that the range of adjustment in this type of embodiment not be limited.

Adjustment knob 402 further comprises a threaded interior surface 408. The spring sleeve 410 comprises a threaded end 412 that corresponds to the threads 408 on the interior surface of the adjustment knob. The spring sleeve 410 comprises two anti-rotation features 414 in the form of cut-outs at the end of the spring sleeve opposite the threaded end 412. Although not illustrated, the body of the stud welding tool in this embodiment comprises a corresponding tab, or other suitable feature, that engages the anti-rotation features 414 and prevents the spring sleeve from rotating with respect to the body. During adjustment, rotation of the adjustment knob 402 causes the spring sleeve 410 to unthread or further thread with respect to the adjustment knob. Because the spring sleeve 410 cannot rotate with respect to the weld tool body, the spring sleeve 410 moves linearly forward or rearward in the tool. The movement of the spring sleeve 410 increases or decreases the amount of compression of the weld timing spring 424.

Clutch 416 comprises adjustment ribs 418 that correspond to and engage adjustment ribs 404 of the adjustment knob 402. Clutch 416 also comprises at least one anti-rotation feature 420. Although not illustrated, the body of the stud welding tool in this embodiment comprises a corresponding feature that engages the anti-rotation feature 420 and prevents the clutch from rotating with respect to the body.

In embodiments such as that illustrated in FIG. 4, the weld heat settings are preferably indicated in a visual manner on the stud weld tool. In a preferred embodiment, an LED display assembly 436 is mounted onto the spring sleeve 410 that provides a visual indication of the amount of compression of the weld timing spring. For example, the LED display assembly 436 can be mounted utilizing spacers 440 and screws 438.

As illustrated in FIG. 4, a wave spring 422 exerts force on clutch 416 to maintain the clutch in an operational position and prevent inadvertent weld heat adjustment. When manual force is exerted on the adjustment knob 402, the clutch 416 compresses the wave spring 422 to allow rotation of the adjustment knob 402.

The weld timing spring 424 is received by the spring sleeve 410. The weld timing spring exerts force on spindle 428, which is received by bearing 426 and is held in place at snap ring 432. As illustrated in FIG. 4, the spindle 428 also has a key 434 that engages a keyway within bearing 426 to prevent the spindle from rotating with respect to the bearing. Additionally, bearing 426 has at least one anti-rotation feature 442. Stroke limiter 430 is preferably installed onto a groove on spindle 428 to limit the maximum amount of travel of the spindle 428. Stroke limiter 430 can be a spiral snap ring, washer, or other suitable device.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims.

What is claimed is:

1. A plunge adjustment mechanism for a stud welding tool, the stud welding tool having a body, a weld spindle, and a solenoid for plunging the spindle, the plunge adjustment mechanism comprising:
   a plunge stop, an adjustment knob having an operation position and an adjustment position, and a bearing configured to receive a weld spindle in sliding engagement with the bearing, the bearing configured to movably engage the plunge stop.

2. The plunge adjustment mechanism of claim 1, wherein the adjustment knob mechanically engages the plunge stop.

3. The plunge adjustment mechanism of claim 1, wherein the bearing includes a threaded collar that rotatably engages the plunge stop, the threaded collar located near an end portion of the bearing adjacent to the plunge stop, and the threaded collar including threads on an outer surface of the threaded collar.

4. The plunge adjustment mechanism of claim 3, wherein rotation of the adjustment knob causes the plunge stop to move along the threads of the threaded collar.

5. The plunge adjustment mechanism of claim 1, wherein the knob is rotatable in the adjustment position, and manual rotation of the knob causes the plunge stop to rotate.

6. The plunge adjustment mechanism of claim 1, further comprising a spring that engages the bearing and exerts a spring force on the knob to maintain the knob in the operation position.

7. The plunge adjustment mechanism of claim 6, wherein a manual force is exerted to counteract the spring force and move the knob into the adjustment position.

8. The plunge adjustment mechanism of claim 7, wherein release of the manual force allows the spring force to move the knob from the adjustment position to the operational position.

9. The plunge adjustment mechanism of claim 1, wherein the bearing is held in a fixed location relative to a body of the stud welding tool.

10. The plunge adjustment mechanism of claim 1, wherein the plunge stop is electrically isolated from the weld spindle by an isolation element, and wherein the isolation element is a component of the bearing.

11. The plunge adjustment mechanism of claim 1, wherein the plunge stop is a spark shield or a tripod leg assembly.

12. The plunge adjustment mechanism of claim 1, wherein the plunge stop comprises brass or aluminum.

13. The plunge adjustment mechanism of claim 1, wherein the plunge adjustment mechanism has plunge settings that allow for adjustment of the plunge in increments of from about 0.005 inches to about 0.01 inches per setting.

14. The plunge adjustment mechanism of claim 13, wherein the plunge settings allow for adjustment of the plunge in increments of about 0.007 inches per setting.

15. A plunge adjustment mechanism for a stud welding tool, the stud welding tool having a body, a weld spindle, and a solenoid for plunging the spindle, the plunge adjustment mechanism comprising:
   a plunge stop having keyways therein;
   a bearing configured to receive a weld spindle in sliding engagement with the bearing, the bearing including a threaded collar, the threaded collar configured to rotatably engage the plunge stop, and the threaded collar including threads on an outer surface of the threaded collar;
   a spring that engages the bearing; and
   an adjustment knob having an operation position and an adjustment position, and having keys therein that engage the keyways of the plunge stop when the adjustment knob is in the adjustment position;
   wherein the spring exerts a spring force on the adjustment knob to maintain the adjustment knob in the operational position;
   wherein the adjustment knob is rotatable in the adjustment position; and
   wherein rotation of the adjustment knob causes rotation of the plunge stop and moves the plunge stop along the threads of the threaded collar.

16. The plunge adjustment mechanism of claim 15, wherein the plunge stop is a spark shield or a tripod leg assembly.

17. The plunge adjustment mechanism of claim 15, wherein the plunge stop comprises brass or aluminum.

18. The plunge adjustment mechanism of claim 15, wherein the plunge adjustment mechanism has plunge settings that allow for adjustment of the plunge in increments of from about 0.005 inches to about 0.01 inches per setting.

19. A plunge adjustment mechanism for a stud welding tool, the stud welding tool having a body, a weld spindle, and a solenoid for plunging the spindle, the plunge adjustment mechanism comprising:

a plunge stop having keyways therein;

a bearing configured to receive a weld spindle in sliding engagement with the bearing, the bearing comprising at least one anti-rotation feature to prevent rotation of the bearing and a threaded collar, the threaded collar configured to rotatably engage the plunge stop, and the threaded collar including threads on an outer surface of the threaded collar;

a spring that engages the bearing; and an adjustment knob having an operation position and an adjustment position, and having keys therein that engage the keyways of the plunge stop when the adjustment knob is in the adjustment position;

wherein the spring exerts a spring force on the adjustment knob to maintain the knob in the operational position;

wherein the adjustment knob is rotatable in the adjustment position; and wherein rotation of the adjustment knob causes rotation of the plunge stop and moves the plunge stop along the threads of the threaded collar.

\* \* \* \* \*